US006842446B2

(12) United States Patent
Everson et al.

(10) Patent No.: US 6,842,446 B2
(45) Date of Patent: Jan. 11, 2005

(54) METHOD AND SYSTEM FOR INCREASING DATA RATE IN WIRELESS COMMUNICATIONS THROUGH AGGREGATION OF DATA SESSIONS

(75) Inventors: John Everson, Kansas City, MO (US); James Norris, Kansas City, MO (US); Dan LaMastres, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 84 days.

(21) Appl. No.: 10/125,948

(22) Filed: Apr. 19, 2002

(65) Prior Publication Data

US 2003/0210663 A1 Nov. 13, 2003

(51) Int. Cl.[7] .......................... H04Q 7/00; H04L 12/64
(52) U.S. Cl. ....................... 370/349; 370/536; 370/328; 370/356; 370/389; 370/401; 370/473
(58) Field of Search ................................. 370/209, 217, 370/218, 230, 230.1, 277, 278, 282, 328, 338, 349, 352, 354, 356, 389, 391–392, 394, 400, 401–403, 437, 445, 465, 466, 473, 474, 475, 477, 536

(56) References Cited

U.S. PATENT DOCUMENTS

| 5,771,229 A | 6/1998 | Gavrilovich ............... 370/342 |
| 6,415,329 B1 * | 7/2002 | Gelman et al. ............ 709/245 |
| 6,496,505 B2 | 12/2002 | La Porta et al. ........... 370/392 |
| 6,563,418 B1 | 5/2003 | Moon ..................... 340/310.1 |
| 2002/0075844 A1 | 6/2002 | Hagen ...................... 370/351 |

FOREIGN PATENT DOCUMENTS

WO    WO 99/18712    4/1999

OTHER PUBLICATIONS

Snoeren, Alex C., "Adaptive inverse multiplexing for wide–area wireless networks," MIT Lab, IEEE 1999, pp. 1665–1672.

Internet Engineering Task Force ("IETF") Request for Comments ("RFCs") 1541, "Dynamic Host Configuration Protocol," R. Droms, Oct. 1993.
Internet Engineering Task Force ("IETF") Request for Comments ("RFCs") 2131, "Dynamic Host Configuration Protocol," R. Droms, Mar. 1997.
Internet Engineering Task Force ("IETF") Request for Comments ("RFCs") 2132, "DHCP Options and BOOTP Vendor Extensions," Alexander, et al., Mar. 1997.
Internet Engineering Task Force ("IETF") Request for Comments ("RFCs") 768, "User Datagram Protocol," J. Postel, Aug. 1980.
Internet Engineering Task Force ("IETF") Request for Comments ("RFCs") 2002, "IP Mobility Support," C. Perkins, Oct. 1996.
Internet Engineering Task Force ("IETF") Request for Comments ("RFCs") 2003, "IP Encapsulation within IP," C. Perkins, Oct. 1996.
Internet Engineering Task Force ("IETF") Request for Comments ("RFCs") 2004, "Minimal Encapsulation within IP," C. Perkins, Oct. 1996.
Internet Engineering Task Force ("IETF") Request for Comments ("RFCs") 2005, "Applicibility Statement for IP Mobility Support," J. Solomon, Oct. 1996.

(List continued on next page.)

Primary Examiner—John Pezzlo
Assistant Examiner—Ahmed Elallam

(57) ABSTRACT

An access aggregator may receive a data stream from a first computing device. The access aggregator may divide the data stream into a plurality of sub-streams. Then, the access aggregator may transmit the sub-streams over multiple wireless communication channels to a network interface. The network interface can then send the sub-streams to a second computing device. Similarly, the second computing device may send data to the network interface, where the data is divided into sub-streams. The sub-streams can be sent to the access aggregator over multiple wireless communication channels and then sent to the first computing device.

19 Claims, 10 Drawing Sheets-

OTHER PUBLICATIONS

Internet Engineering Task Force ("IETF") Request for Comments ("RFCs") 1661, "The Point-to-Point Protocol (PPP)," W. Simpson, Jul. 1994.

Internet Engineering Task Force ("IETF") Request for Comments ("RFCs") 1662, "PPP in HDLC-like Framing," W. Simpson, Jul. 1994.

Internet Engineering Task Force ("IETF") Request for Comments ("RFCs") 1663, "PPP Reliable Transmission," D. Rand, Jul. 1994.

Internet Engineering Task Force ("IETF") Request for Comments ("RFCs") 791, "Internet Protocol DARPA Internet Program Protocol Specification," Information Sciences Institute, Sep. 1981. Internet Engineering Task Force ("IETF") Request for Comments ("RFCs") 793, "Transmission Control Protocol DARPA Internet Program Protocol Specification," Information Sciences Institute, Sep. 1981.

"Bandwidth Aggregation, Teaming and Bonding," Vicomsoft, http://www.vicomsoft.com/knowledge/reference/bondteam.html, printed Jul. 18, 2002.

"ePipe 2000 Family Key Networking Concepts," Stallion Technologies, http://www.stallion.com.au/html/userdoc/epipe/epipe-key-concepts-3.html, printed Jul. 18, 2002.

* cited by examiner

METHOD AND SYSTEM FOR INCREASING DATA RATE IN WIRELESS COMMUNICATIONS THROUGH AGGREGATION OF DATA SESSIONS

FIELD OF THE INVENTION

This method generally relates to wireless data transmission. More particularly, it relates to a method for increasing data rates in a wireless network.

BACKGROUND OF THE INVENTION

Many people own or operate multiple computing devices. These devices may support communication (e.g., voice calls, instant messaging), information storage (e.g., contact lists, to-do lists, phone books), research (e.g., via the World Wide Web), entertainment (e.g., desktop and Internet games) and many other applications. Common computing devices include mobile phones, personal digital assistants, compact computers (e.g. Windows® CE devices), notebook computers and desktop computers.

These computing devices can be used to communicate with other devices. For example, a computing device may communicate with another device through a network, such as the Internet. The two devices may establish a session between each other, and they may exchange data over the network. Each computing device may connect with the network in a variety of different ways. For example, a computing device may use a modem and a hard-wired connection, such as a phone line, to connect to an Internet Service Provider ("ISP"). In turn, the ISP may provide connectivity to the Internet or to another network.

A wired connection to the network, however, limits the mobility of a computing device. In order to achieve a greater mobility, the computing device may wirelessly connect to the network. By using a wireless connection between a computing device and the network, the computing device may roam through a number of different locations during a single session. The computing device may connect to a network, for example, by using a cellular wireless network or by using another type of wireless network.

In one example, the computing device may include a modem connected to a wireless device, such as a mobile phone. The computing device may send data through the modem to the wireless device, and the wireless device may transmit the data over a wireless connection to a receiver. The receiver may then provide connectivity to the network, such as the Internet. Once received by the receiver, the data can be forwarded to another device that is also connected to the network.

Wireless networks, however, are often slower than wired connections. The data rate of a wireless network may be limited due to various factors, such as bandwidth, noise, low transmission power or other factors. Design considerations may also limit the data rate of a wireless network. For example, networks that are primarily designed to carry voice calls, such as some cellular networks, often have a limited bandwidth. The limited bandwidth of these network, as well as other design considerations, can limit their data rate more than an equivalent wired voice network.

Therefore, there exists a need to provide an increased data rate in wireless communications.

SUMMARY OF THE INVENTION

An access aggregator may receive data from a first device. The access aggregator may interface with one or more wireless devices, or one or more wireless devices may be integrated into the access aggregator. The access aggregator may receive a data stream from the first device, and the access aggregator may divide the data stream into a plurality of sub-streams. The access aggregator may then transmit the plurality of sub-streams over multiple communication channels using the wireless devices, thereby advantageously increasing the transmission rate of the data. Then, the sub-streams can be received and sent to a second device.

In another embodiment, the second device may send a data stream to the first device. The data stream may be received by a network interface, and the network interface may divide the data stream into a plurality of sub-streams. Each sub-stream may then be transmitted over the multiple communications channels to the access aggregator, there by increasing the rate at which data can be transmitted to the access aggregator. Then, the access aggregator can receive the multiple sub-streams and send them to the first device.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
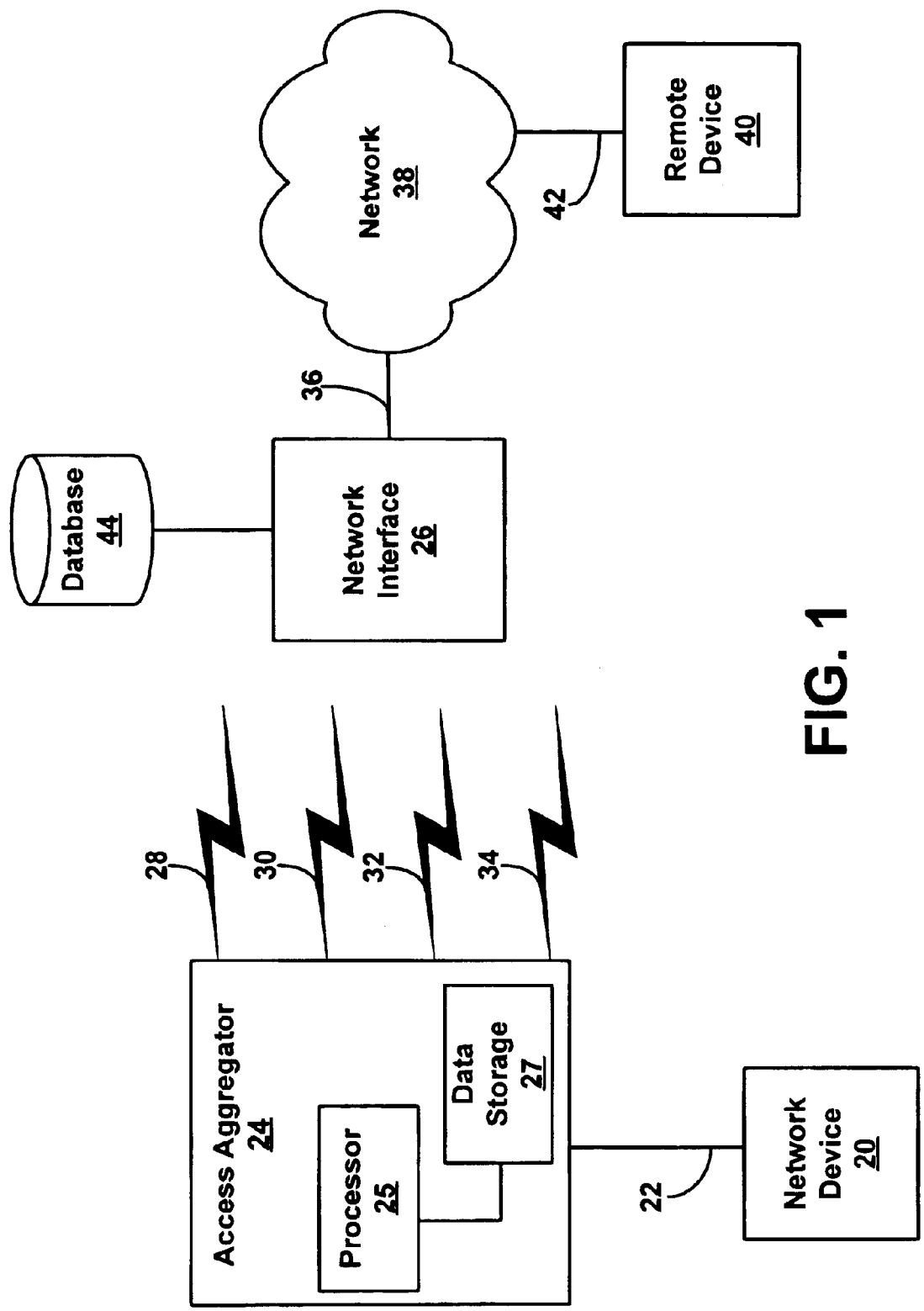
FIG. 1 is an exemplary system for aggregation of data in a wireless network.

FIG. 1 shows an exemplary system for aggregation of data in a wireless network. A network device 20 interfaces over a data link 22 with an access aggregator 24. The access aggregator 24 can receive data from the network device 20. The network device 20 may receive a single packetized data stream, and it may divide the data stream into a plurality of sub-streams. The access aggregator 24 may transmit each of the sub-streams over a respective communication channel to a network interface 26.

In one exemplary operation, the access aggregator 24 may receive the single data stream, and it may divide the single data stream into four sub-streams. The four sub-streams may then be wirelessly transmitted to the network interface 26 using a respective communication channel for each sub-stream. One sub-stream may be transmitted over a first communication channel 28; a second sub-stream may be transmitted over a second communication channel 30; a third sub-stream may be transmitted over a third communication channel 32; and, a fourth sub-stream may be transmitted over a fourth communication channel 34. Of course, these numbers are merely exemplary in nature. The access aggregator 24 may use a different number of communication channels and a different number of sub-streams, and the number of sub-streams may differ from the number of communication channels.

In one embodiment, the single data stream received from the network device 20 may identify the network device 20 as the source of the single data stream, such as by using a source address in data packets sent from the network device 20 to the access aggregator 24. The single stream may be broken into multiple sub-streams for transmission over their respective communication channels 28, 30, 32, 34. Each sub-stream of packets may identify a different source and destination address corresponding to the respective communication channel. For example, each packet in a sub-stream may identify a source address corresponding to the wireless device used to transmit the sub-stream over the communication channel, and each packet in the sub-stream may also identify a destination address corresponding to the network interface 26.

The network interface 26 can receive the four sub-streams transmitted by the access aggregator 24. The network interface 26 may then modify the four sub-streams to reconstruct the single packet stream original transmitted by the network device 20. For example, the network interface 34 may modify the source address of the sub-stream packets to reflect the network device 20 as the source of the packets instead of the wireless device for the respective communication channel. The network interface may also alter the destination address of the packet, for example, to reflect original destination address specified by the network device 20. It should be understood that the original packet stream may be reconstructed simply by changing the source and destination addresses of packets in the sub-streams and then forwarding the packets to their indented destination in a random order. Although possible, it is not necessary to reassemble the packets in the same order as the original packet stream before sending them to their destination.

The network interface 26 can connect over a data link 36 to a data network 38, such as the Internet or another network. The packets can be transmitted to a remote device 40, which also connects to the network 38 over a data link 42. Then, the remote device 40 can receive the packets and identify them as coming from the network device 20, for example, by reading the source addresses of the received packets.

Similarly, the remote device 40 may transmit data to the network device 20. For example, the remote device 40 may send a packet stream over the network 38 to the network interface 26. The network interface 26 may divide the packet stream into multiple sub-streams. Each of the multiple sub-streams may then be transmitted over a respective communication channel to the access aggregator 24. Then, the access aggregator 24 can forward the packet streams to the network device 20.

Before transmitting the packets to the access aggregator 24, however, the network interface 26 may modify the packets to reflect different source and destination addresses, such as by modifying the packets to reflect the source and destination addresses corresponding to the respective transmission channel used for transmitting the packets to the access aggregator 24 instead of the original source and destination addresses corresponding to the network device 20 and the remote device 40. Once received by the access aggregator 24, the access aggregator 24 may then modify the packets to reflect the remote device 40 as the source and the network device 20 as the destination, and it may forward the packets to the network device 20. The network device 20 can then accurately identify the packets as originating from the remote device 40 based on the source address of the packets.

In one exemplary embodiment, the network interface 26 may divide the packet stream into four sub-streams for transmission to the access aggregator 24. Each sub-stream may use a source address corresponding to the communication channel 28, 30, 32, 34 used to transmit that sub-stream. The network interface 26 may also modify the destination address, such as to identify the respective wireless devices. Then, the sub-streams may be transmitted over their respective communication channels. For example, one sub-stream may be transmitted over one communication channel 28; a second sub-stream may be transmitted over another communication channel 30; a third sub-stream may be transmitted over the third communication channel 32; and, a fourth sub-stream may be transmitted over the fourth communication channel 34. Of course, different numbers of sub-streams and communication channels may also be used.

Then, the access aggregator 24 may receive the four sub-streams transmitted by the network interface 24 over the communication channels 28, 30, 32, 34. The access aggregator 24 may modify the sub-streams to reform the original packet stream sent by the remote device 40. For example, the access aggregator 24 may change the source address in the received packets to reflect the remote device 40 as the source of the original packet stream. The access aggregator 24 may also change the destination address in the received packets to identify the network device 20 as the intended destination of the packets. Then, the access aggregator 24 may then send the packets to the network device 20.

As illustrated in FIG. 1, the access aggregator 24 might include a processor 25 for executing instructions. The access aggregator 24 might also include data storage 27, which can store various instructions for execution on the processor 25. The processor 25 can access the data storage 27 to retrieve and then execute the instructions.

Figure 2:
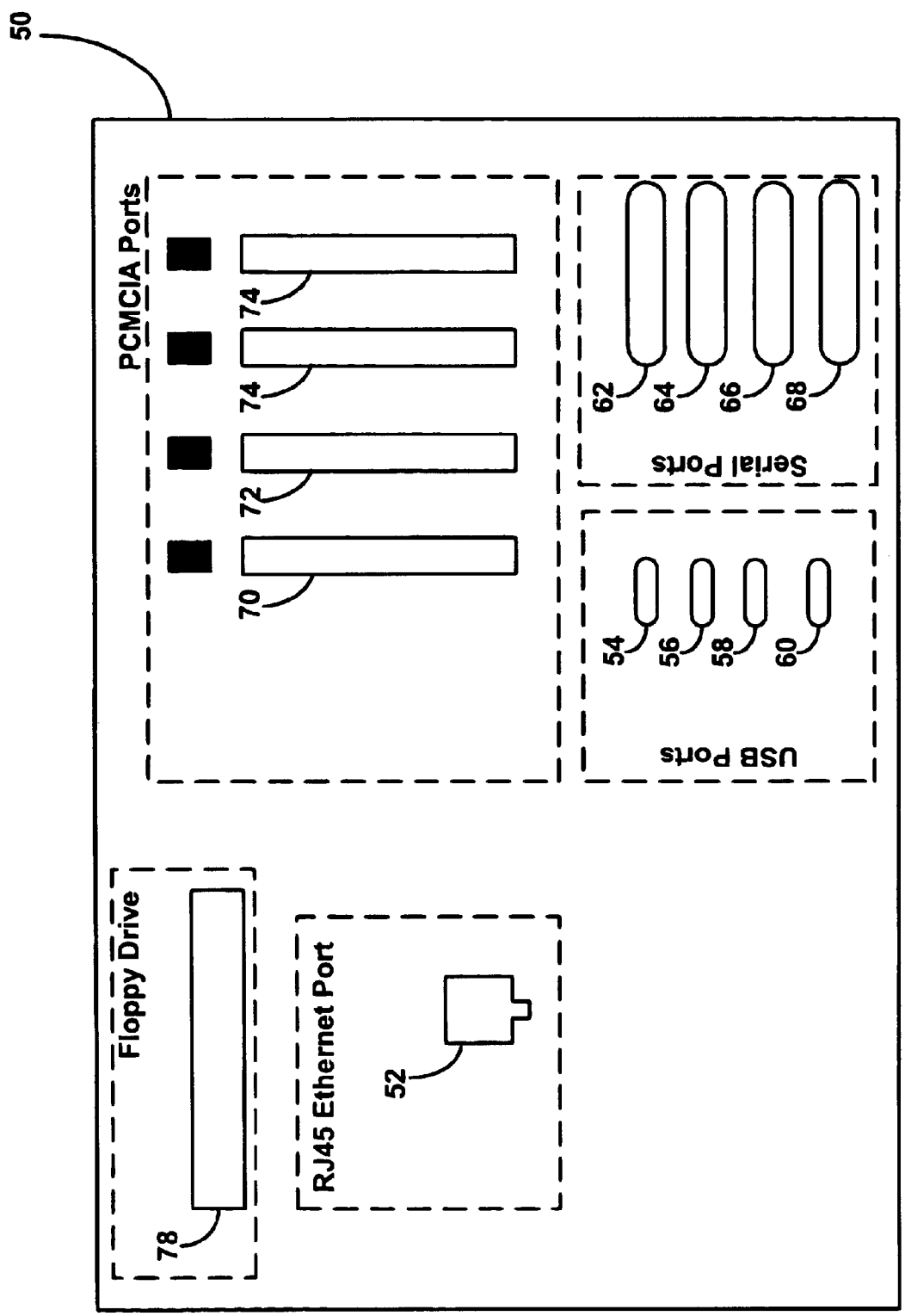
FIG. 2 shows a front view of an exemplary access aggregator that may be used in the system described in FIG. 1.

FIG. 2 shows a front view of an exemplary access aggregator 50 that may be used as the access aggregator 24 described in FIG. 1. The access aggregator 50 may include an Ethernet port 52 that can be used to connect to the network device 20 over an Ethernet network. As is known in the art, Ethernet is a protocol for exchanging data over a network. The Ethernet port 52 may support various different types of communication links between the devices. For example, the Ethernet port 52 may support 10 Base2, 10 Base5, 10 BaseT, 100 BaseT or other Ethernet links. The links may connect to the Ethernet port 52 through a number of different physical connectors. For example, the physical connector may be a RJ-45 jack, a T connector or another type of connector. The type of connection may vary depending on the type of communication link used between the access aggregator 50 and the network device 20. Additionally, several different implementations of the Ethernet protocol may be used, such as Carrier Sense Multiple Access with Collision Detect ("CSMA/CD"), token ring, token bus or other Ethernet protocols. Ethernet is described in more detail in the Institute of Electrical and Electronics Engineers ("IEEE") standards 802.3, 802.4 and 802.5, all of which are incorporated herein by reference in their entirety.

In alternate embodiments, the access aggregator 50 may interface with the network device 20 through a different type of port. For example, the access aggregator 50 may include a serial port, a parallel port, a universal serial bus ("USB") port, an IEEE 1394 port, a small computer system interface ("SCSI") port, an intelligent drive electronics ("IDE") port, an enhanced IDE ("EIDE") port or other type of port. The network device 20 may then communicate with the access aggregator 50 using a protocol that is compatible with the port type used by the access aggregator 50.

These different types of ports may be in place of or in addition to the Ethernet port 52. For example, the access aggregator 50 may include an Ethernet port 52 and a SCSI port. In another example, the access aggregator 50 may also include multiple interfaces of the same type, such as two Ethernet ports. In another example, the access aggregator 50 may include different combinations of ports, such as two Ethernet ports and a USB port. Other combinations are possible, and these may also be used.

While the network device 20 may interface with the access aggregator 50 through a wired connection, it may also interface through a wireless connection. The network device 20 may use a wireless protocol to communicate with the access aggregator 50. For example, the network device 20 may communicate with the access aggregator 50 using a wireless protocol such as IEEE 802.11, Bluetooth, Wireless Access Protocol ("WAP"), or Code Division Multiple Access ("CDMA"). Other wireless protocols may also be used.

The Ethernet port 52, or other type of interface, may be used to connect to the network device 20. The network device 20 may be any type of device capable of communicating with the access aggregator 50. For example, the network device 20 may be a computer, a mobile phone, a fax machine, a personal digital assistant ("PDA"), an Internet appliance, or another type of device. Also, more than one network device may connect to the access aggregator 50. Additionally, the access aggregator 50 may connect to a network instead of directly to one or more devices. For example, the access aggregator 50 may connect to an Ethernet switch, concentrator, router or other type of connection. Then, the access aggregator 50 could be used to send and receive data with one or more devices on the network. Of course, these are only exemplary in nature, and other types of devices and connections may also be used.

The access aggregator 50 may also include transmission interfaces, such as ports, that may be used to connect to one or more wireless devices. The wireless devices can then be used to transmit data between the access aggregator 50 and a wireless network. The transmission interfaces may connect to the wireless devices in a variety of different ways. FIG. 2 illustrates one exemplary configuration for the access aggregator 50. As depicted in FIG. 2, the access aggregator 50 may include four USB transmission interfaces 54, 56, 58, 60, which may be USB ports. As is known in the art, a USB port can connect two or more devices according to a specified USB standard. A single USB port can connect to up to 127 different devices. Additionally, the access aggregator may include four serial transmission interfaces 62, 64, 66, 68, which may be serial ports. As is known in the art, serial communication is a method that can be used to connect two devices. In serial communication data is generally sent between the two devices one bit at a time. One exemplary protocol for serial communications is RS-232c, which is incorporated by reference herein in its entirety.

The access aggregator 50 may also include four Personal Computer Memory Card International Association ("PCMCIA") transmission interfaces 70, 72, 74, 76, which can be used to connect to PCMCIA cards. As is known in the art, a PCMCIA card can be inserted into an interface, such as one of the PCMCIA transmission interface 70, 72, 74, 76. The PCMCIA card can provide connectivity between the device having the interface and another device according a defined protocol. Of course, these interfaces are exemplary in nature. Other types of interfaces and other combinations of interfaces may also be used. For example, the access aggregator 50 may include parallel, SCSI, IEEE 1394, IDE, EIDE or other ports. Other combinations are also possible, and these may also be used.

In alternate embodiments, the access aggregator 50 may include different combinations of the different types of transmission interfaces. For example, the access aggregator 50 may include only PCMCIA and USB transmission interfaces. In another embodiment, the access aggregator 50 may include a smaller or greater number of the transmission interfaces. In yet another embodiment, it may include different numbers of the different types of transmission interfaces. For example, access aggregator 50 may include one USB port, two PCMCIA ports and various other numbers of different ports. Many other combinations are also possible, and these may also be used.

The transmission interfaces may connect to wireless devices, and, in turn, the wireless devices may connect to a wireless network, such as a wireless radio access network or a cellular network. The transmission interfaces may then be used in conjunction with one or more of the wireless devices to transmit data from the access aggregator 50 over the wireless network. For example, the access aggregator 50 may receive data from the network device 20. Then, the access aggregator 50 may use the wireless devices to transmit the data wireless to another network or device. Similarly, the wireless devices can be used to receive data, which can then be sent to the network device 20.

In another exemplary embodiment, the access aggregator 50 may include one or more wireless devices that may be built-in to the access aggregator 50. The built-in wireless devices may be used to transmit information received from the network device 20. Additionally, the built-in devices may be used to receive information destined for the network device 20. The built-in devices may be used in conjunction with other wireless devices that can connect to the access aggregator 50 through the transmission interfaces, or the built-in wireless devices may be used in place of external devices connecting to the access aggregator 50 through the transmission interfaces.

Figure 3:
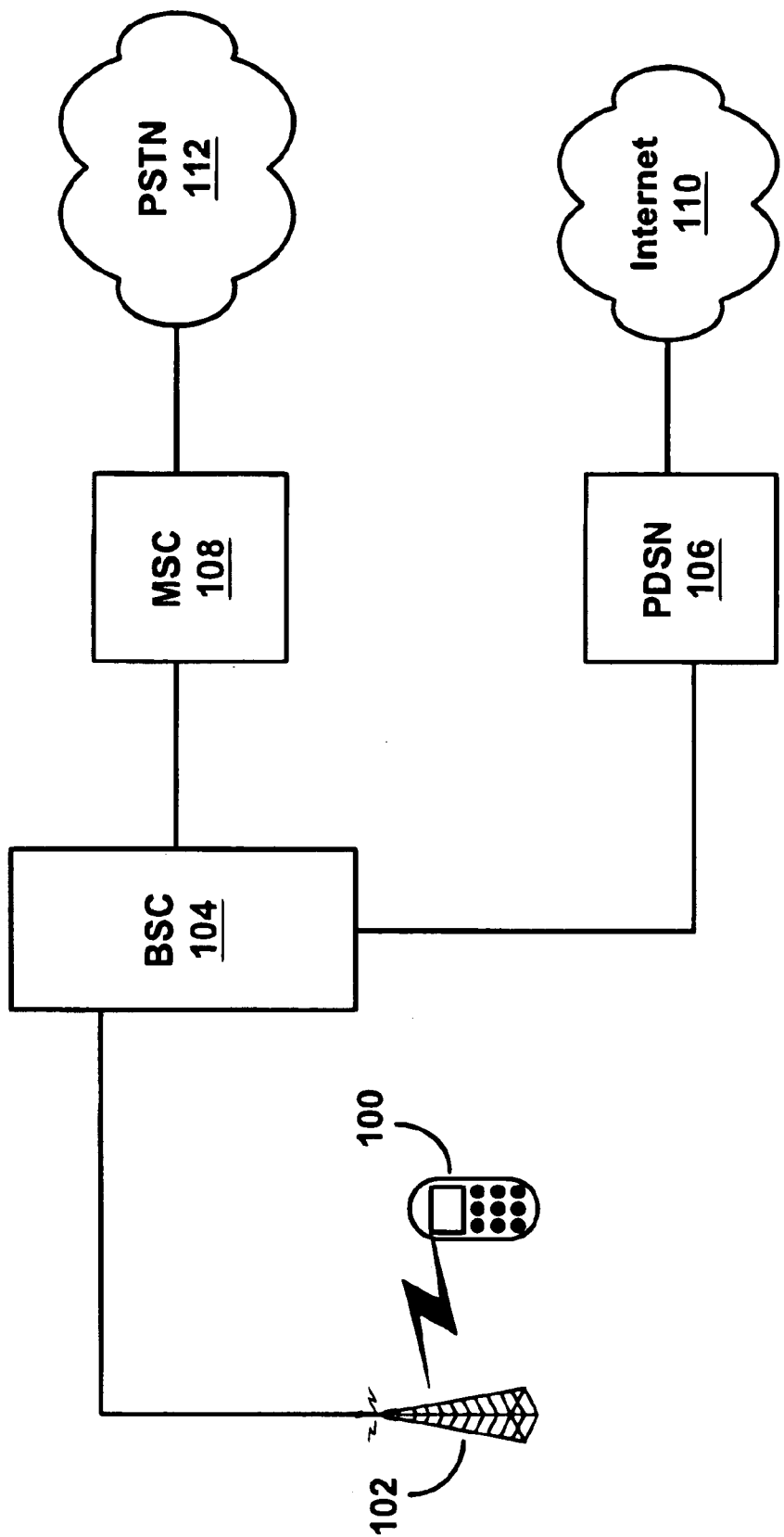
FIG. 3 shows an exemplary architecture for a cellular network that can be used for wireless communication in the system described in FIG. 1.

FIG. 3 shows an exemplary architecture for a cellular network that can be used by the wireless devices connected to the access aggregator 24. In one exemplary embodiment, a wireless device 100 wirelessly connects with the cellular network, and the wireless device 100 can then communicate with another device on the cellular network. In turn, the cellular network may provide connectivity to the public switched telephone network ("PSTN") 112. The cellular network may also provide connectivity to a packet data serving node ("PDSN") 106, which in turn can provide connectivity to a packet-switched network, such as the Internet 110. Through this connectivity, a wireless device 100 may communicate with a device on one of these networks.

The wireless device 100 may be a cellular phone, a mobile phone, a personal digital assistant ("PDA"), an Internet equipped computer, or another wireless device. While FIG. 1 depicts one wireless device 100 connected to the cellular network, the cellular network may include a plurality of wireless devices 100. Also, more than one type of wireless device 100 may connect to the cellular network. For example, a cellular phone, a mobile phone and other devices could all be used to connect to the cellular network.

As shown in FIG. 3, the wireless device 100 links to a base transceiver station antenna ("base station") 102 through an air interface. The wireless device 100 can communicate with the base station 102 using a variety of different protocols. In an exemplary embodiment, the wireless device 100 communicates with the base station 102 using CDMA. CDMA provides a method for sending wireless signals between the wireless device 100 and the base station 102. In a CDMA system, the base station 102 communicates with the wireless device 100 over a spread spectrum of frequencies.

In a CDMA system, multiple wireless devices may use the same frequency range, and the multiple wireless devices may each simultaneously communicate with the base station 102 using the same frequency range. A wireless device in a CDMA system spreads its signal across the frequency range. Spreading the signal across a wide bandwidth, such as approximately 1.266 MHz, can reduce interference between signals from different wireless devices. This can allow individual signals to be differentiated from other signals, and therefore, accurately recovered. In order to perform signal spreading, each wireless device may be assigned a unique code, such as a Walsh code. The code may be a sequence of bits, such as a 64 bit binary number; however, other lengths may also be used.

The wireless device 100 can transmit data by creating a modulated signal. The modulated signal may be created, for example, by modulating the wireless device's unique code with the data to be transmitted. In creating the modulated signal, the modulation bit rate of the code is ordinarily greater than the bit rate of the data. Once the modulated signal is created, it can then be sent over the common frequency range to the base station 102.

To accurately recover the modulated signal, the base station 102 can also store the unique code used by the wireless device 100. Then, the base station 102 can monitor the frequency range for signals having the modulation pattern of the wireless device's code. This allows the base station 102 to differentiate the signal of the wireless device 102 from the signals of other the other wireless devices, which can appear as noise. After recovering the modulated signal, the base station 102, or other device, can then recover the data from the modulated signal. For example, the base station 102 can demodulate the modulated signal using the unique code for the wireless device 100. Communication from the base station 102 to the wireless device can occur in a similar manner, although it may occur in a different frequency range.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other protocols may also be used for communication between the wireless device 100 and the base station 102. For example, the wireless device 100 and the base station 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA") or other protocols. Additional wireless protocols such as IEEE 802.11, bluetooth and others may also be used.

The base station 102 couples to a base station controller ("BSC") 104, which can perform various functions such as managing handoffs of the wireless device as it moves among base stations. The BSC 104 in turn connects to a mobile switching center ("MSC") 108. The MSC 108 can manage setup and teardown of connections with the wireless device 100. While the BSC 104 and the MSC 108 are depicted as separate components, it is possible that their functionality may be combined into a single component.

The MSC 108 can additionally provide connectivity to the PSTN 112. Using the connectivity, the wireless device 100 may then communicate with another device that is also connected to the PSTN 112. The wireless device 100 may also communicate with another device on the cellular network.

In addition to connecting to the MSC 108, the BSC 104 may also connect with a PDSN 106. The PDSN 106 can provide connectivity to a packet-switched network, such as the Internet 110, an intranet or another network. Once the wireless device 100 connects, for example, to the Internet 110, it can exchange data with other devices that are also connected to the Internet 110.

For example, the remote device 40 may also connect to the Internet 110, and through the Internet 110 it may communicate with the wireless device 100. The remote device 40 may be any device capable of connecting to the Internet 110, such as a cellular phone, a mobile phone, a PDA, a computer, an Internet appliance or another device. The remote device 40 may connect with the Internet 110 in a variety of different ways.

In one exemplary embodiment, the remote device 40 may be part of a local area network ("LAN"), and it may connect to the LAN using a network interface card ("NIC"). The LAN may in turn provide connectivity to the Internet 110 through an Internet Service Provider ("ISP") or another gateway. Alternatively, the remote device may connect to a private intranet, such as a core packet network of a wireless service provider, which can in turn provide connectivity to the Internet 110. Once connected to the Internet 110, the remote device 40 and the wireless device 100 may communicate with each other using a variety of different protocols.

For example, the wireless device 100 may establish a Point-to-Point Protocol ("PPP") session with the PDSN 106. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662 and 1663, all of which are incorporated herein by reference in their entirety.

Once connected to the PDSN 106, the wireless device 100 can access the Internet 110 and communicate with the remote device 40. While the wireless device 100 may communicate with the PDSN 106 through a PPP session, it may communicate with the remote device 40 using higher level protocols. For example, the wireless device 100 may use the Transmission Control Protocol ("TCP")/Internet Protocol ("IP") suite to communicate with the remote device 40.

TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

Each device may be assigned an IP address, which is 32-bits long. The IP address assigned to a device is usually globally unique, and this allows data to be accurately sent between devices on different networks. Data to be transmitted between devices is placed into an IP packet. The IP packet can include a header portion and a data portion. The header portion generally identifies a source device and a destination device, while the data portion carries the data to be transmitted between the two devices.

Figure 4:
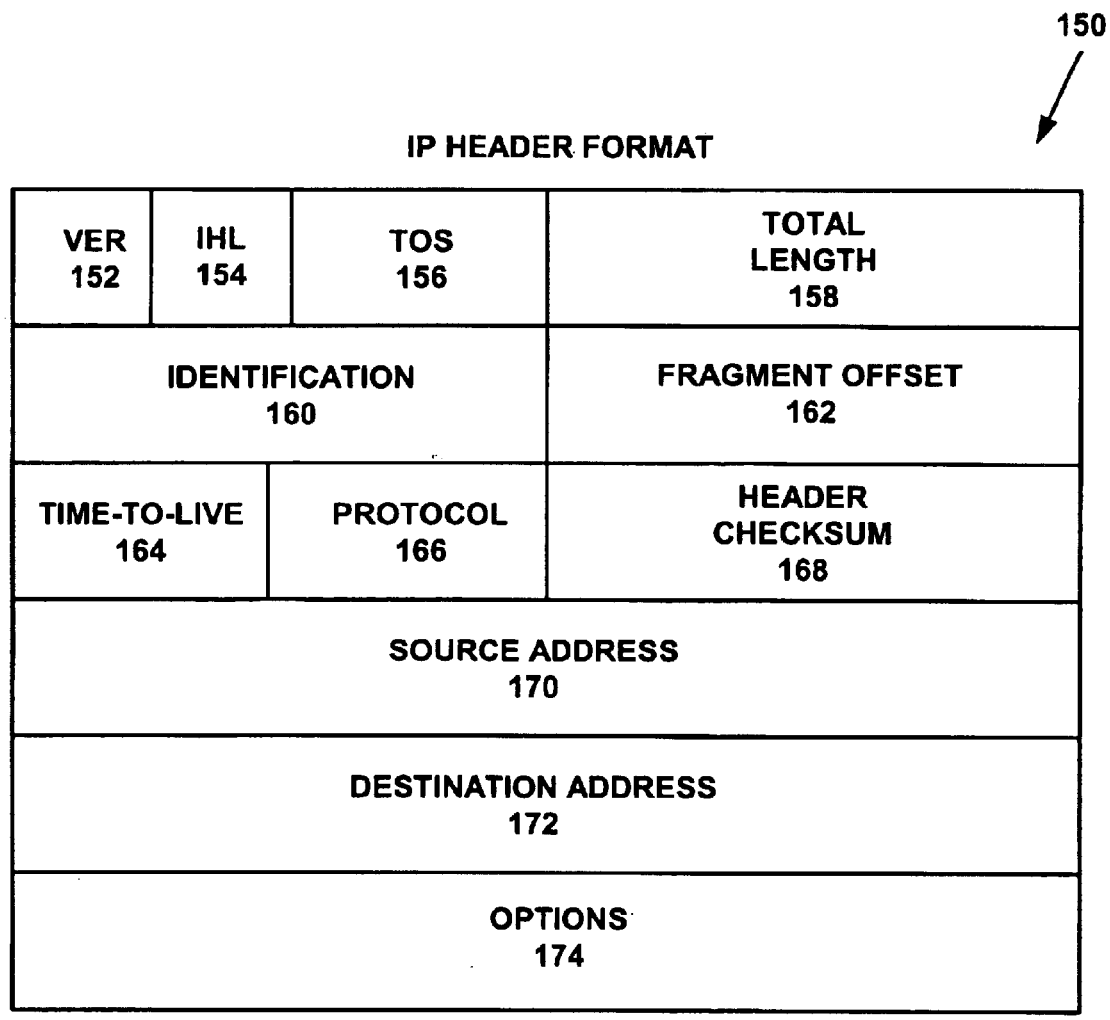
FIG. 4 is a block diagram illustrating an IP packet header that can be used in the system of FIG. 1.

FIG. 4 is a block diagram illustrating an IP packet header 150. The IP packet header 150 includes a number of different fields. The version field 152 can indicate an IP version, such as IPv4 or IPv6. The Internet Header Length ("IHL") field 154 can indicate the length of the header. The Type-of-Service ("ToS") field 156 can indicate a requested type of service. The total length field 158 can indicate the length of everything in the IP packet, including the IP header 150. The identification-field 160 may be used for packet fragmentation. The fragment offset field 162 can also be used for packet fragmentation. The Time-To-Live ("TTL") field 164 can be a hop count, which is used to limit the lifetime of the IP packet.

The protocol field 166 can indicate a protocol used with the IP packet. For example, TCP, User Datagram Protocol ("UDP"), Encapsulating Security Payload ("ESP"), and Authentication Header ("AH") are common protocols that may be used in conjunction with IP. Other protocols may be used as well. The header checksum field 168 can be used to verify the contents of the IP packet header 150. The source address field 170 may include a source IP address for a sending device, and the destination address field 72 may include a destination IP address for a receiving device. The options field 174 can be used for security, source routing, error reporting, debugging, time stamping or other information. IP data may be carried in the IP packet data portion, which generally appended below the options-field 174.

The IP packet is sent over the network, and, using the IP address in the destination address field 172 of the IP packet header 150, appropriately routed to the destination device. The packet may travel through different devices and across different networks before ultimately reaching its destination. The IP address can help to provide accurate routing through the intermediate devices to the intended destination device.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order. IP is described in more detail in IETF RFC 791, which is incorporated herein by reference in its entirety. TCP is described in more detail in IETF RFC 793, which is incorporated herein by reference in its entirety.

TCP/IP is one method for sending data between two devices, and other Internet or network protocols may also be used. For example, the User Datagram Protocol ("UDP") may be used in conjunction with IP to exchange data between devices. UDP provides a connectionless protocol for exchanging data between devices, such as devices connected over an IP network. UDP does not guarantee reliable transmission between the devices, and it provides only minimal error protection. UPD is described in further detail in IETF RFC 768, which is incorporated herein by reference in its entirety.

Another protocol that may be used for communication between the two devices is Mobile IP, which is an extension of IP. An IP address is usually associated with one particular network. A wireless device may be assigned an IP address, which is associated with the wireless device's home network; however, during a communication session the wireless device might roam to another network.

Mobile IP is an extension of the IP protocol that allows a mobile node to transparently move between different IP sub-networks and to still receive data addressed to the IP address associated with the mobile node's home network. While the mobile node dynamically changes its network connectivity, this is transparent to protocol layers above IP (e.g., TCP or UDP).

Mobile IP is described in more detail in the Internet Engineering Task Force Request For Comment 2002, "IP Mobility Support," C. Perkins, October 1996, which is incorporated herein by reference in its entirety. Internet Engineering Task Force Request For Comments 2003–2005, which are each incorporated herein by reference in their entirety, also describe Mobile IP in more detail.

2. Exemplary Operation

Figure 5:
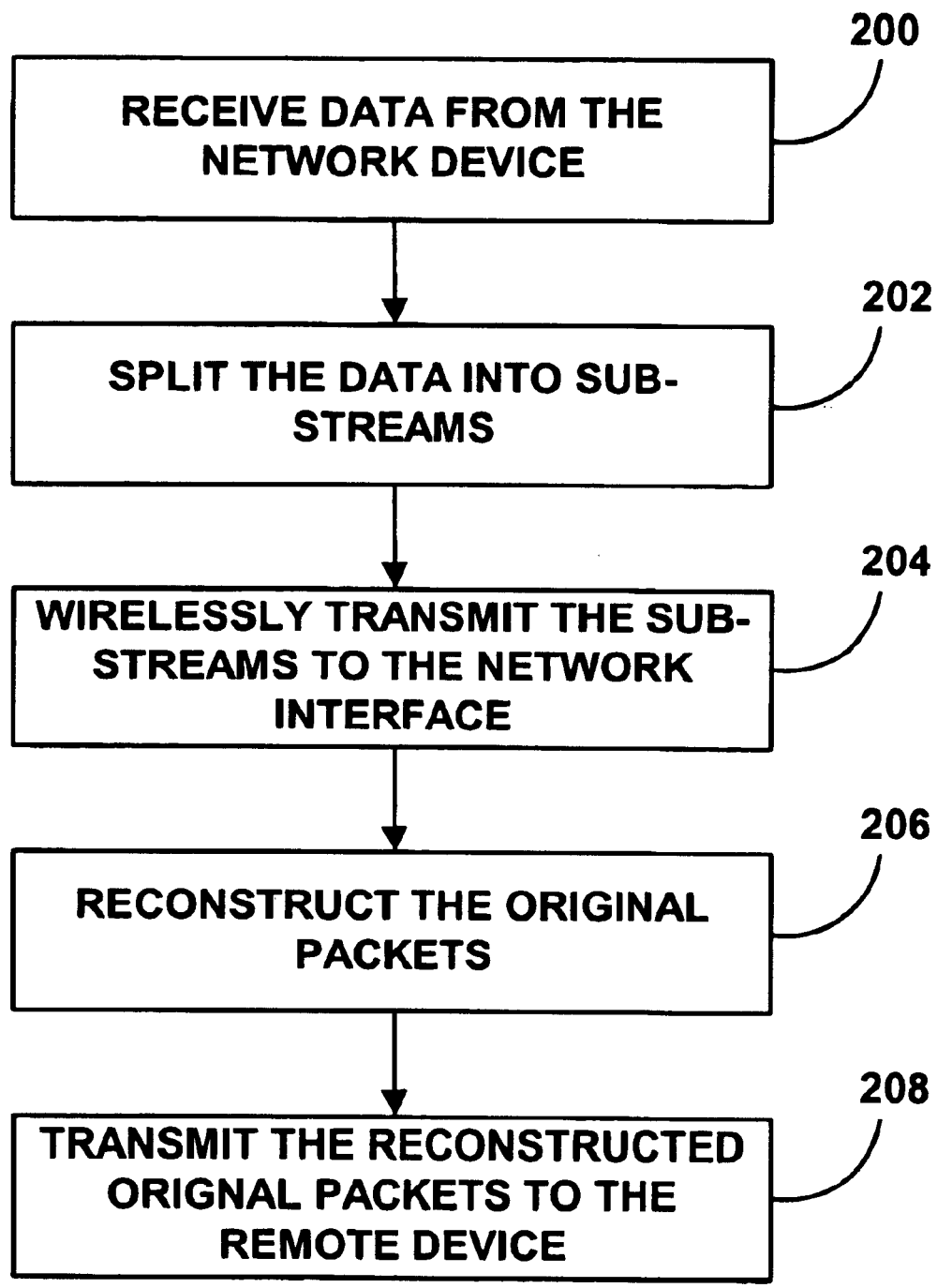
FIG. 5 is a flowchart for an exemplary process for transmitting data from a network device to a remote device.

FIG. 5 is a flowchart depicting functions that may be involved in transmitting data from the network device 20 to the remote device 40 using the access aggregator 24. At Step 200, the network device 20 sends to the access aggregator data to be transmitted to the remote device 40. The data may be, for example, a stream of packets. In an exemplary operation, the access aggregator may receive data from the network device 20 via the Ethernet port 52. The data received from the network device 20 may be IP packets. Each IP packet may be destined for a common destination device, such as the remote device 40.

Then, at Step 202, the access aggregator 24 may divide the packets received from the network device 20 into sub-streams. At Step 204, the access aggregator 24 may transmit the sub-streams over respective transmission channels to the network interface. For example, one sub-stream may be transmitted over one communication channel, while another sub-stream may be transmitted over another communication channel. At Step 206, the sub-streams may be received by the network interface 26. Then, the network interface 26 may reconstruct the original data stream from the sub-streams, shown at Step 206. Finally, at Step 208, the reconstructed data stream can be sent to the remote device 40.

Figure 6:
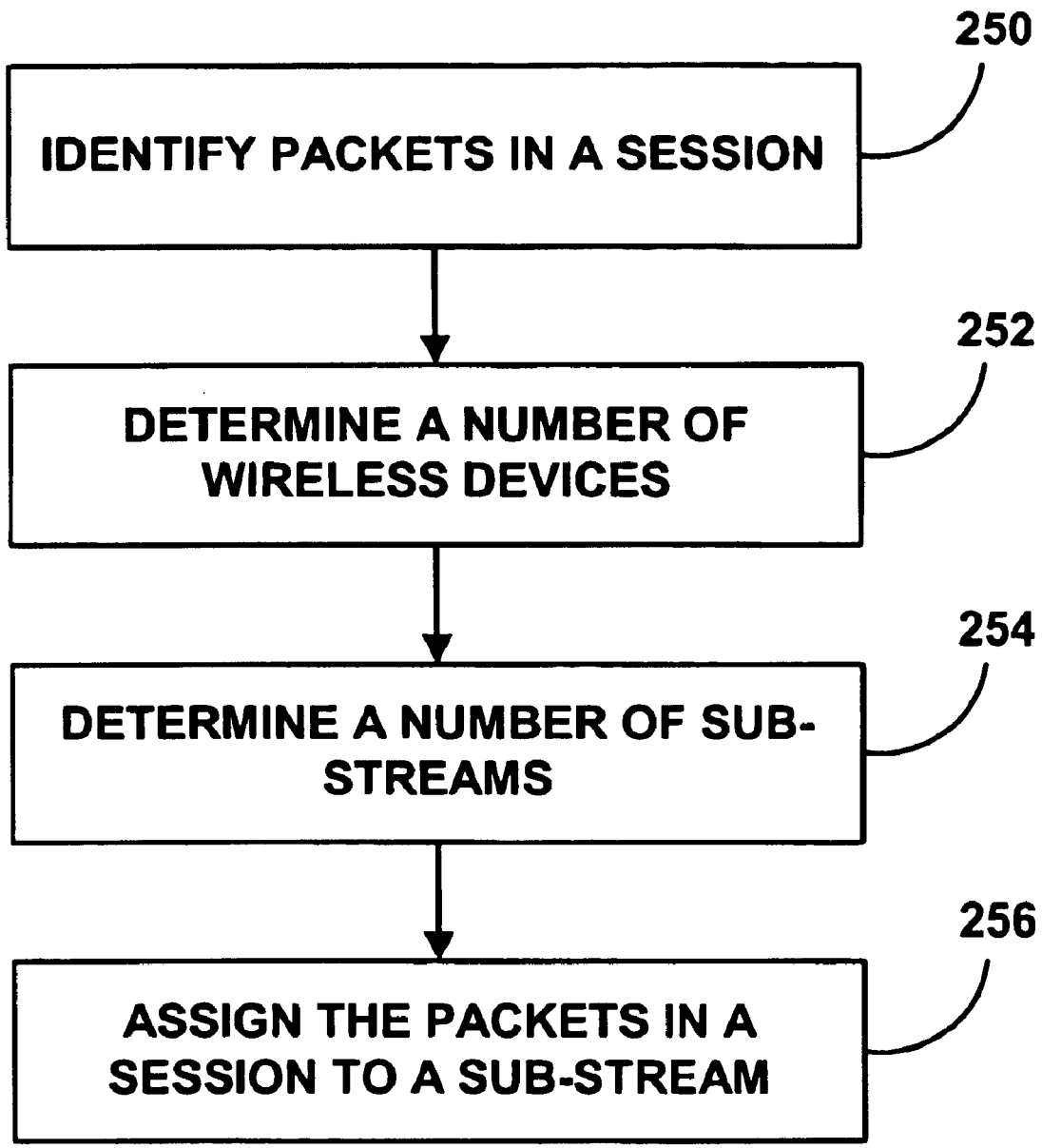
FIG. 6 is a flowchart for an exemplary process for splitting the data into sub-streams.

FIG. 6 is a flowchart depicting functions that may be involved in splitting the data into sub-streams. This process may be used, for example, as Step 202 in FIG. 5. With reference to FIG. 6, at Step 250, the access aggregator 24 may identify packets in a session that are received from the network device 20. For example, the access aggregator 24 may receive IP packets from the network device 20. The IP packets may identify the network device 20 by its IP address. The IP packets may also identify a destination device, such as the remote device 40. The destination device may also be identified by its IP address. To determine if multiple received packets are part of the same session, the access aggregator may, for example, compare the source and destination address.

Then, at Step 252, the access aggregator 24 may determine a number of active wireless devices. For example, the access aggregator 24 may poll its transmission interfaces to determine if the transmission interfaces are connected to active wireless devices. It is possible that a transmission interface does not connect to an active device, and therefore, that transmission interface could not be used to send data to the network interface 26. In another possibility, a transmission interface may connect to a wireless device, but the wireless device may be inactive. For example, a transmission interface may connect a wireless device that is turned off. Therefore, the access aggregator 24 would not be able to use that wireless device for transmission to the network interface 26.

Once the access aggregator 24 determines the number of connected and active wireless devices, then at Step 254, the access aggregator may determine the number of sub-streams to use for transmission to the network interface 26. The number of sub-streams may be determined in variety of different ways. In one exemplary embodiment, the access aggregator 24 may use the same number of sub-streams as active wireless devices. For example, if the access aggregator 24 connects to three active wireless devices, then the access aggregator 24 may use three sub-streams. While the operation of the access aggregator 24 may appear transparent to the network device 20, in another exemplary embodiment the access aggregator 24 may receive transmission information from the network device 20 or from another source. The transmission information may specify, for example, a number of wireless devices or a number of sub-streams to use for communication with the network interface 26.

Then, at Step 256, the access aggregator 24 may assign a packet received from the network device 20 to a sub-stream. This may be done using a variety of different methods. For example, the access aggregator 24 may assign packets to the various sub-streams in a rotating fashion. If the access aggregator 24 uses three sub-streams, then the access aggregator 24 may assign a first received packet to the first sub-stream. The access aggregator 24 may assign a second received packet to the second sub-stream, while a third received packet is assigned to the third sub-stream. Then, when the access aggregator 24 receives a fourth packet, the access aggregator 24 assigns the fourth packet to the first sub-stream. The assignment can continue in a similar rotating fashion.

In another exemplary operation of assigning packets to sub-streams, the access aggregator may assign groups of packets to the sub-streams. For example, the first five received packets could be assigned to the first sub-stream, while the next five received packets may be assigned to the second sub-stream. This type of assignment could also proceed in a rotational fashion depending on the number of sub-streams.

In yet another exemplary operation of assigning sub-streams, the access aggregator 24 may take into account the transmission rates of the wireless devices. For example, the access aggregator 24 may interface with two wireless devices; however, the wireless devices may transmit to the network interface 26 using different transmission rates. The access aggregator 24 may then assign more packets to the wireless device with the faster transmission rate. Of course, it is not necessary that the wireless devices have unequal transmission rates before the access aggregator 24 splits packets among sub-streams in an unequal manner.

In another exemplary embodiment, the procedure for assigning sub-streams may change during a data session between the network device 20 and the remote device 40. For example, wireless devices may be connected or disconnected from the access aggregator 24 during a data session between the network device 20 and the remote device 40. The addition of a wireless device may potentially increase the bandwidth between the access aggregator 24 and the network interface 26, while removing a wireless device may potentially decrease the bandwidth between the access aggregator 24 and the network interface 26.

The access aggregator 24 may detect an added wireless device, and it may detect the disconnection of a wireless device. Then, the access aggregator 24 may alter its method for dividing packets received from the network device 20 into sub-streams. For example, when a wireless device is added to the access aggregator 24, the access aggregator 24 may increase the number of sub-streams. Then, the access aggregator 24 may start transmitting a sub-stream over the added wireless device. Alternatively, when the access aggregator 24 detects that a wireless device has been disconnected, it may decrease the number of sub-streams. Then, the access aggregator 24 may reallocate the packets that would previously have been transmitted by the disconnected device to the remaining wireless devices. The changed number of sub-streams may occur transparently to the network device 20 and the remote device 40. While the number of sub-streams may remain constant during a session between the network device 20 and the remote device 40, they may alternatively change one or more times during a session.

Once the packets received from the network device 20 have been divided into sub-streams, the sub-streams may be wirelessly transmitted to the network interface 26. It should be understood that the process of receiving packets, altering the packets and transmitting the packets to the network interface 26 can be a continuous process. For example, as packets arrive at the access aggregator 24 from the network device 20, the packets may be assigned to a sub-stream, altered for transmission over the sub-stream and transmitted to the network interface 26. Although possible, it is not necessary that the access aggregator 24 receive all the packets for the data session before splitting them into sub-streams, altering the sub-streams and transmitting the sub-streams to the network interface 26.

Figure 7:
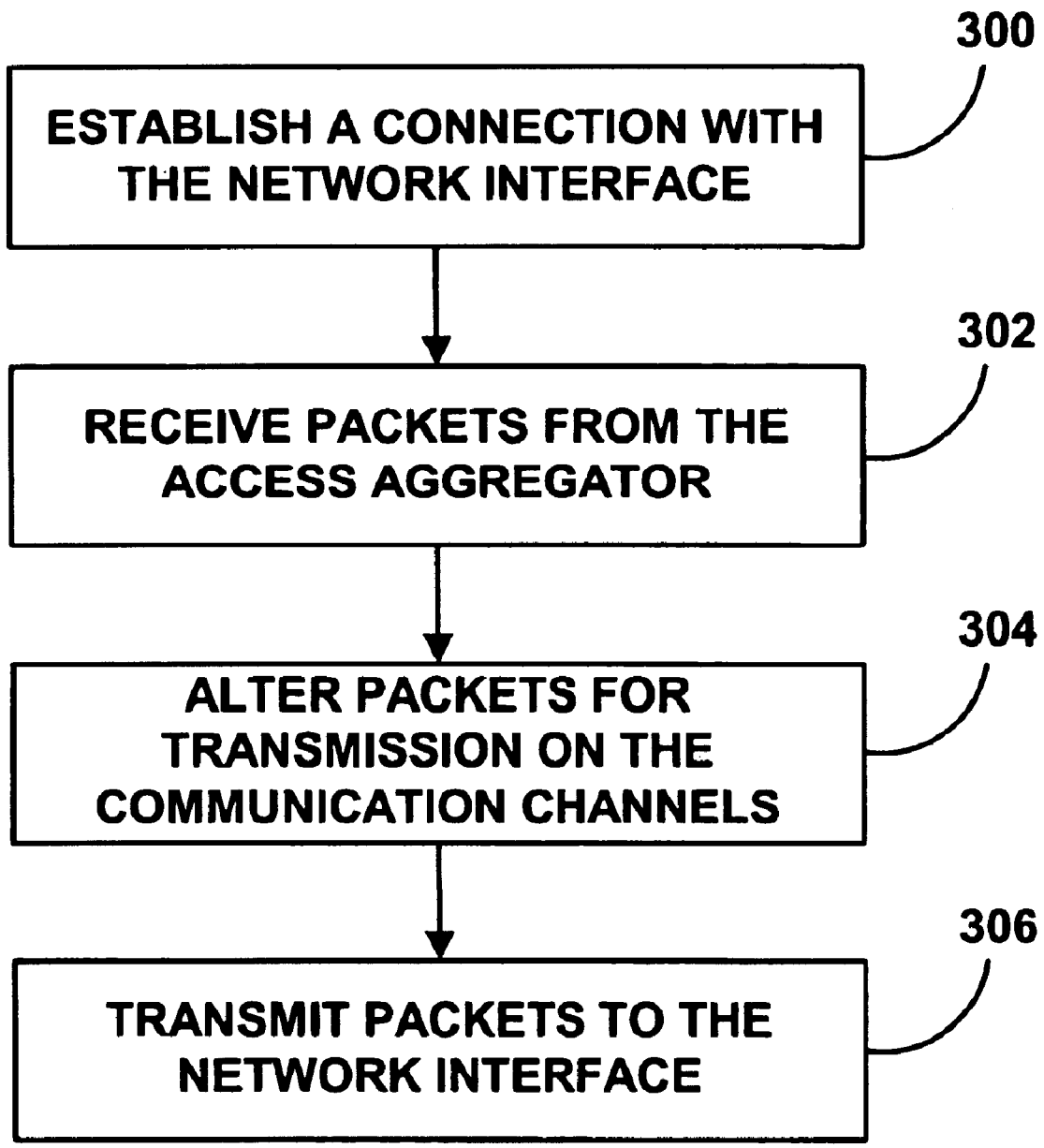
FIG. 7 is a flowchart of an exemplary process for transmitting a sub-stream to a network interface.

FIG. 7 is a flowchart of an exemplary process for transmitting a sub-stream to the network interface 26. This process may be used, for example, as Step 204 of FIG. 5. With reference to FIG. 7, at Step 300 each wireless device connected to a transmission interface may establish a connection with the network interface 26. For example, the wireless device may establish a TCP/IP session with the network interface 26, and the wireless device may identify itself using an IP address. This IP address may differ from the IP address of the network device 20. Similarly, the network interface 26 may use an IP address for the TCP/IP session with the wireless device, and this address may differ from the IP address of the remote device.

Then, at Step 302, the wireless device may receive a packet from the access aggregator 24 for transmission to the network interface 26. The packet, however, may identify the network device 20 as the source of the packet, such as by using the IP address of the network device 20 in the source address field 170 of the IP packet header 150. Additionally, the packet may identify the remote device 40 as the destination of the packet by using the IP address of the remote device 40 in the destination address field 172 of the IP packet header 150. In order to transmit the packet from the wireless device to the network interface 26, the wireless device may alter the packet, shown at Step 304.

In one exemplary embodiment of altering the packet, the wireless device may encapsulate the IP packet received from the access aggregator 24 into an encapsulating IP packet. For example, the packet received from the access aggregator 24 may be placed in the data portion of an encapsulating IP packet. The header information of the encapsulating IP packet can be set to reflect the TCP/IP session between the wireless device and the network interface 26. For example, encapsulating IP packet may identify the wireless device as the source of the packet, and it may identify the network interface as the destination of the encapsulating packet. This can be done by setting the source and destination address fields of the encapsulating IP packet header to reflect the IP addresses of the wireless device and the network interface 26.

In another exemplary embodiment for altering the packet, the wireless device may alter the packet for communication over the TCP/IP session between the wireless device and the network interface 26 by changing the source IP address of the packet to indicate the wireless device as the packet's source. For example, it may be change the source address field 170 of the IP packet header 150 to include the IP address of the wireless device. Similarly, the wireless device may change the destination address field 172 of the IP packet header to include the IP address of the network interface 26.

Other variations of altering the packets are also possible. In one alternative embodiment, the wireless device may further alter the packet in order to provide encryption or other services. In yet another embodiment, all or part of the alterations may be performed by the access aggregator 24. For example, the access aggregator may change the source and destination IP address of the packet before sending the packet to the wireless device. In another example, the access aggregator 24 may encapsulate the packet before sending it to one of the wireless devices. Other variations are also possible, and these may also be used.

Then, at Step 306, the packet may be transmitted to the network interface 26. The network interface 26 can receive packets transmitted from the wireless devices connected to the access aggregator 24, and the network interface 26 may communicate with the different wireless devices over respective TCP/IP sessions. Once received by the network interface 26, the packets may be reconstructed to form the original packet stream.

Figure 8:
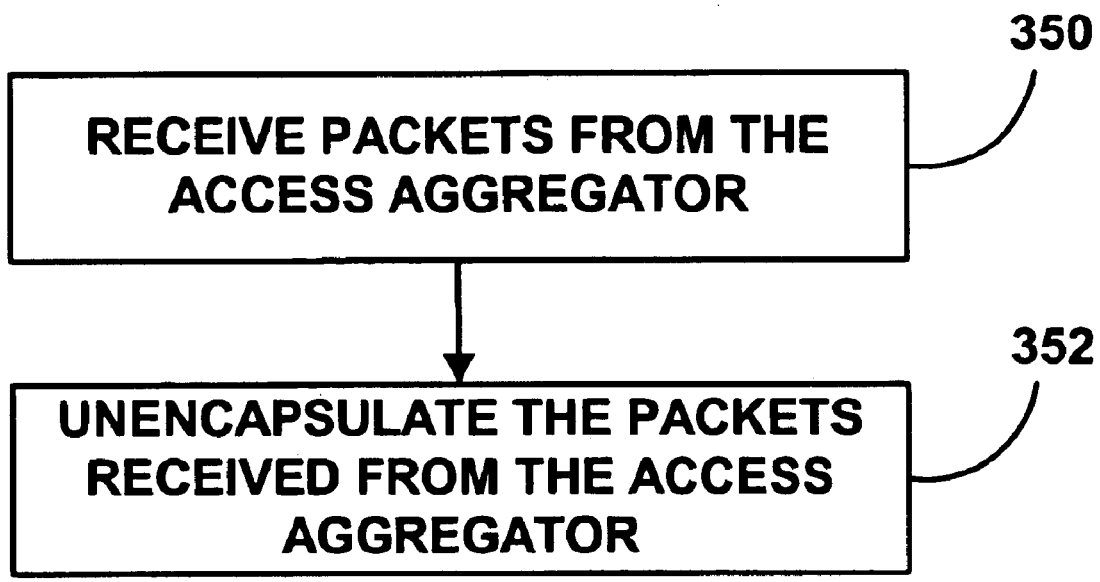
FIG. 8 is a flowchart of an exemplary process that may be used to reconstruct sub-streams carrying encapsulated packets.

FIG. 8 is a flowchart of an exemplary process that may be used to reconstruct the sub-streams received from wireless devices when the sub-streams carry encapsulated packets. The process depicted in FIG. 8 may be used, for example, as Step 206 of FIG. 5. At Step 350, the network interface 26 receives packets transmitted from the access aggregator 24. Then, at Step 352, the network interface 26 unencapsulates the packets received from the access aggregator 24. While the packets received by the network interface 26 may identify IP addresses used by the respective wireless devices, the encapsulated packets may reflect the IP addresses of the network device 20 and the remote device 40. By retrieving the encapsulated packets, the network interface 26 can reconstruct the sub-streams to reform the original data. As previously discussed, the network interface 26 may continuously receive and unencapsulate packets received from the access aggregator 24. Additionally, the network interface 26 may forward the unencapsulated packets to the network device 40 in many different orders, such as the order the packets were received by the network interface 26.

Figure 9:
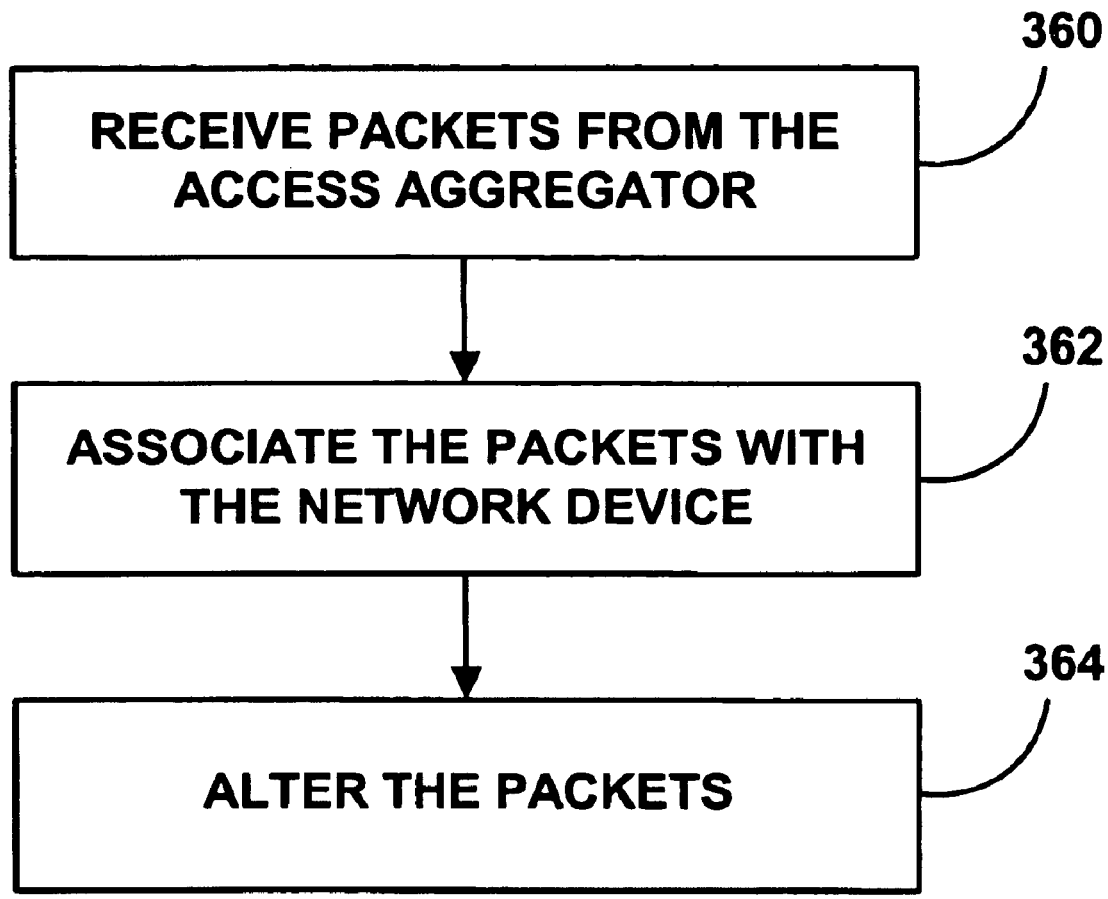
FIG. 9 is a flowchart of an alternate exemplary process that may be used to reconstruct sub-streams.

FIG. 9 is a flowchart of another exemplary process that may be used to reconstruct the packets received from the access aggregator 24 that do not use encapsulation. It may be used, for example, when the access aggregator 24 simply changes the IP addresses in the packets transmitted by the wireless devices instead of encapsulating the packets. This process may also be used as Step 206 of FIG. 5. At Step 360, the network interface 26 receives a packet transmitted by one of the wireless devices connected to the access aggregator 24. The packet may, however, identify the wireless device as the source of the packet instead of the network device 20, and it may also identify the network interface 26 as the destination of the packet instead of the remote device 40. At Step 362, the network interface 26 associates the packet with the network device 20 and the remote device 40. This may be done, for example, by accessing a database that can be included in the network interface 26. The database may alternatively be located outside the network interface 26, or the network interface 26 may access one or more database in a combination of locations.

The database may be used to correlate packet identifying a wireless device and network interface with a corresponding network device and remote device session. When the network interface 26 receives a packet, the network interface 26 can compare the packet with the records stored in the database 44. The network interface 26 may, for example, use the source and the destination addresses of the received packet to search the database 44. By using the database 44, the network interface 26 can determine if the packet is associated with a network device 20, and if it is, the network interface 26 can also determine the IP address of the network device 20. Likewise, the network interface 26 may also determine the remote device 40 IP address to be used as the destination of the packet.

The listings of IP addresses in the database 44 and their corresponding network device associations can be set using a variety of different methods. In one exemplary embodiment, the IP addresses of the remote device and network device pairs may be set manually. For example, they may be programmed by a system administrator or by another operator.

In another embodiment, the network device and remote device pair associations may be set dynamically, such as when the wireless device connects with the network interface 26. For example, when the wireless device establishes a connection with the network interface 26, the wireless device can inform the network interface 26 that the wireless device will be sending information for the network device 20 and that the information will ultimately be destined from the remote device 40. As part of the connection process, the wireless device may send the network interface 26 the wireless device's IP address. The wireless device may also send the network interface 26 the IP addresses for the network device 20 and the remote device 40. After receiving the information from the wireless device, the network interface 26 may store the association, such as by creating an entry in the database 44. That entry can then be used to process packet received from the wireless device.

In another embodiment, the network interface 26 may run a Dynamic Host Control Protocol ("DHCP") application program. When the wireless device establishes a connection with the network interface 26, the network interface 26 may assign the wireless device an IP address to use for that session. The network interface 26 may also store that IP address. Then, the wireless device may send the network interface the IP addresses of a corresponding network device and remote device in order to create an association. When the network interface 26 receives packets from the wireless device, it can use the stored association to correctly forward the packets to the appropriate remote device and to reflect the network device as the packet's source. Of course, the association may also be used for communication from the remote device to the network device. DHCP is described in more detail in IETF RFCs 1541, 2131, 2132, which are all incorporated herein by reference in their entirety.

After associating an incoming packet with the network device 20, the network interface 26 may change the packet to reflect the network device 20 as the source of the packet, as shown at Step 364. For example, the network interface 26 may change the source address field 170 to indicate the IP address of the network device 20, thereby identifying the network device 20 as the source of the packet. Similarly, the network interface 26 may change the destination address field 172 of the IP packet header to reflect the IP address of the remote device 40. Then, the network interface 26 may send the packet to the remote device 40.

While FIG. 9 describes a process for reconstructing the packets received from the wireless devices to reform the original data stream, it should be understood that it is not necessary that the network interface 26 reassemble the sub-stream packets into the order in which the access aggregator 24 received them from the network device 20. In one exemplary embodiment, the network device 20 and the remote device 40 may communicate using the TCP/IP protocol suite. Among other functions, TCP handles reordering packets when they arrive at their destination device out of order. Therefore, it may not necessary that the network interface 26 reassemble the original packet sequence from the sub-sequences sent by the wireless devices.

The packets received by the network interface 26 may be processed and sent to the remote device 40 in different orders, such as in the order they are received by the network interface 26. For example, the network interface 26 may continually receive packets from the access aggregator 24. As the network interface 26 receives the packets, the network interface 26 may alter the packets and transmit them to the remote device 40. Of course, the packets may also be processed by the network interface 26 and sent to the remote device 40 in other orders. For example, they may be reassembled into the order of the original packet sequence, or they may be sent to the remote device 40 in any other sequence. For packets that arrive at the network device 40 out of their original order, the network device 40 may handle reassembling the packets in the proper order to retrieve the original data, such as by using TCP.

While the access aggregator 24 can be used to send data from the network device 20 to the remote device 40, it can also be used to receive information sent from the remote device 40 to the network device 20. For example, the access aggregator 24 may receive multiple sub-streams from the network interface 26. It may then reconstruct those sub-streams into a single packet stream, which can then be sent to the remote device 20.

Figure 10:
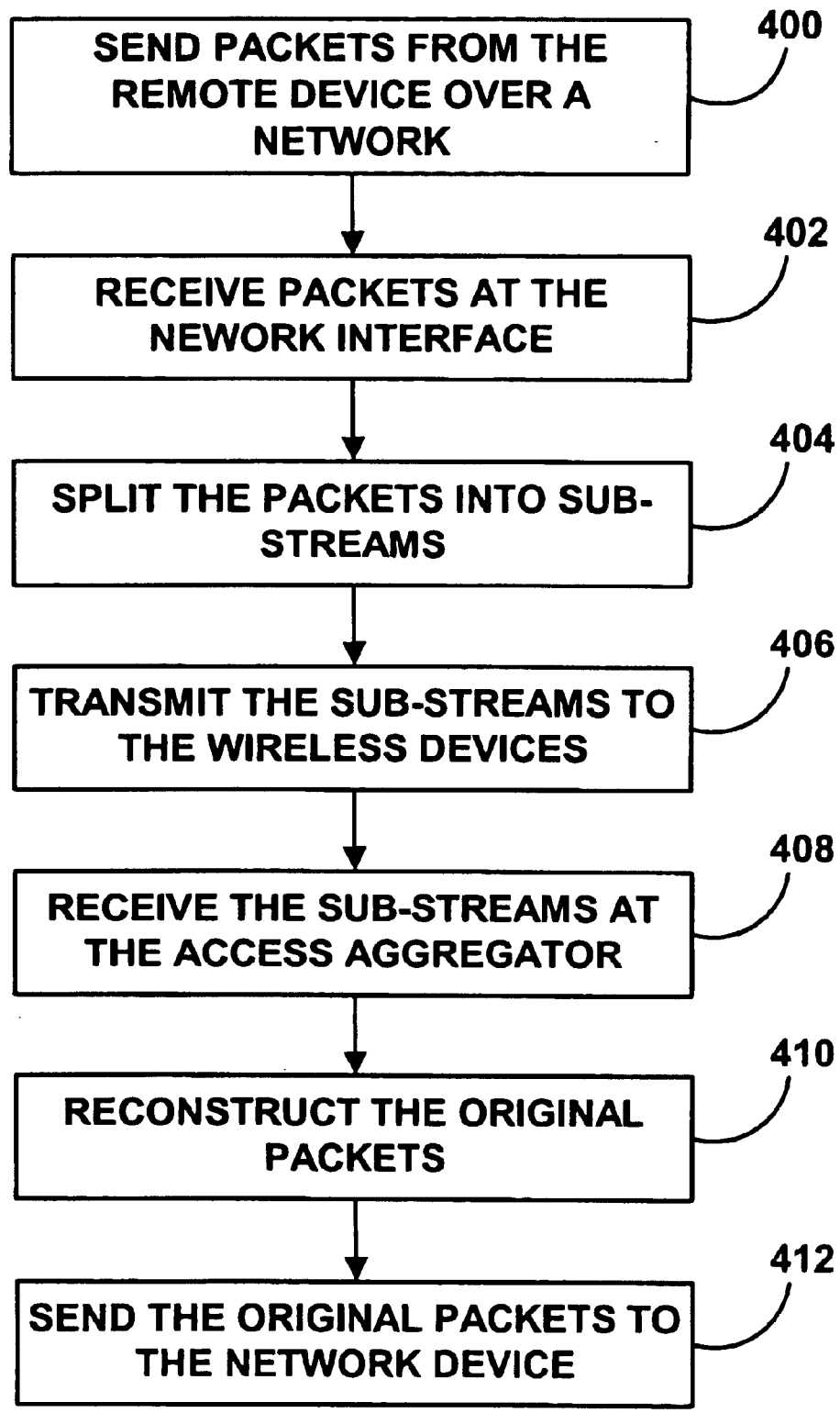
FIG. 10 is a flowchart of an exemplary process for transmitting data from a remote device to a network device.

FIG. 10 is a flowchart of an exemplary process for using the access aggregator 24 to facilitate communication from the remote device 40 to the network device 20. At Step 400, the remote device 40 sends data to the network device 20. For example, the remote device 40 may send the network device 20 TCP/IP packets that are part of a TCP/IP session between the remote device 40 and the network device 20. The packets may be sent through one or more networks where they are ultimately received at the network interface 26, shown at Step 402. Then, at Step 404, the network interface 26 splits the packets received from the remote device 40 into sub-streams. This may be done similarly to the process previous described for communication from the network device 20 to the remote device 40.

In one exemplary embodiment, the network interface 26 determines a number of wireless devices capable of receiving data, and the network interface 26 divides the packets into that number of sub-streams. For example, the network interface 26 may access the database 44 to determine which communication channels correspond to the network device 20. Then, the network interface 26 may split the packets into sub-streams based on the number of communication channels.

In order to split the packets in to sub-streams, the network interface may access the database 44. The database 44 can store information about the number of access aggregators connected to the network interface 26, the wireless devices used by an access aggregator connected to the network interface, IP address information for the wireless devices, communication speeds for the wireless devices, or other information. This information may be stored in a variety of different ways. In one exemplary embodiment, the database 44 stores two tables that include information about the wireless devices and their respective communication channels.

Table 1 stores information for two different access aggregators. The table correlates IP addresses for one or more network devices with an access aggregator to use for transmission to each network device. As shown in Table 1, the first access aggregator can be used to transmit data to four different network devices. The second access aggregator, however, only connects to one network device. Of course, these configurations are exemplary in nature and other configurations may also be used.

TABLE 1

| Access Aggregator | IP Address | Network Device IP Address |
|---|---|---|
| #1 | aaa.aaa.aaa.aaa | hhh.hhh.hhh.hhh |
| #1 | aaa.aaa.aaa.aaa | iii.iii.iii.iii |
| #1 | aaa.aaa.aaa.aaa | jjj.jjj.jjj.jjj |
| #1 | aaa.aaa.aaa.aaa | kkk.kkk.kkk.kkk |
| #2 | eee.eee.eee.eee | lll.lll.lll.lll |

Once the network interface 26 receives a packet destined for a network device, it can use Table 1 to determine which access aggregator to use for transmitting the packet to the network device. For example, it can use the network device address in the packet to find a correlating access aggregator IP address in Table 1. After determining which access aggregator to use, the network interface 26 can use Table 2 to retrieve information about the wireless devices connected to the selected access aggregator. As shown by Table 2, the first access aggregator uses three wireless devices to communicate with the network interface 26, and the second access aggregator uses two wireless devices. In addition to storing the number of wireless devices connected to the access aggregator, the table also stores the IP addresses of the wireless devices and an average bandwidth for each wireless device.

TABLE 2

| Access Aggregator | IP Address | Wireless IP Address | Wireless Avg. Bandwidth |
|---|---|---|---|
| #1 | aaa.aaa.aaa.aaa | bbb.bbb.bbb.bbb | 56k bps |
| #1 | aaa.aaa.aaa.aaa | ccc.ccc.ccc.ccc | 14.4k bps |
| #1 | aaa.aaa.aaa.aaa | ddd.ddd.ddd.ddd | 24k bps |

TABLE 2-continued

| Access Aggregator | IP Address | Wireless IP Address | Wireless Avg. Bandwidth |
|---|---|---|---|
| #2 | eee.eee.eee.eee | fff.fff.fff.fff | 56k bps |
| #2 | eee.eee.eee.eee | ggg.ggg.ggg.ggg | 56k bps |

The network interface 26 could then use number of wireless devices connected to the access aggregator and the average bandwidth of the wireless devices to split received packets into sub-streams. For example, it could split the packets into the same number of sub-streams as wireless devices, and it could allocate more packets to sub-streams that will be transmitted on wireless devices with higher average bandwidths. Of course, the network interface 26 may also split the packets into sub-streams using different or additional criteria.

The database 44 can be dynamically updated by each access aggregator. For example, each access aggregator can send maintenance messages to the network interface 26. The maintenance messages can indicate the wireless devices connected to the access aggregator and can also indicate the IP addresses of the network devices connected to the access aggregator. The bandwidth information for the wireless devices can be determined by the access aggregator and also included in the maintenance messages. The bandwidth information can periodically change to reflect the average bandwidth for each wireless device starting from the time when the wireless device last connected to the network interface. Of course, other ways of computing the average bandwidth may also be used. Dynamically updating the information in the database 44 can advantageously allow for wireless devices to be added or removed without unduly interrupting communication between the access aggregator and the network interface 26. Additionally, it can allow the network interface 26 and the access aggregator to account for changing bandwidths of the wireless devices.

At Step 406, the network interface 26 may then transmit the sub-streams to the wireless devices connected to the access aggregator 24. As previously described, the network interface 26 may first alter the packets to reflect the parameters of the individual communication sessions between the network interface 26 and the wireless devices. In one exemplary embodiment, the network interface 26 encapsulates the packets. The encapsulating packets can identify the specific parameters for the communication channel used by the wireless device. For example, the packets can identify the IP address of the network interface as the source IP address, and they can identify the IP address of the wireless device as the destination IP address. The wireless devices addresses may be obtained, for example, using Table 2 stored in the database 44.

In another exemplary embodiment, the network interface 26 may simply change the destination and source address fields of the received packets instead of encapsulating the packets. The destination address field 172 in the IP packet header 150 can be changed to reflect a wireless device as the destination of the packet, and the source address field 170 in the IP packet header 150 can be changed to reflect the network interface 26 as the source of the packet. The wireless device IP addresses can be obtained using Table 2 stored in the database 44.

Once encapsulated or otherwise altered, the packets can then be transmitted to the access aggregator. At Step 408, the packets may be received at the access aggregator 24. For example, they may be received at the wireless devices and then sent to the access aggregator 24. After receiving the packets, the access aggregator 24 may reconstruct the original packet stream, shown at Step 410. In one exemplary embodiment, the packets received by the wireless devices may be encapsulating packets. The access aggregator 24 may then reconstruct the original packet stream by extracting the encapsulated packets from the encapsulating packets.

In an alternate embodiment, the access aggregator 24 may access a database, which can be stored by the access aggregator 24 or which can be stored externally. Using the database, the access aggregator 24 may determine that the packet received from the wireless device corresponds to a particular remote device and network device pair. Then, the access aggregator 24 may change the destination address of the IP packets to reflect the network device 20 as the intended destination. Similarly, the access aggregator 24 may change the source address of the IP packets to reflect the remote device 40 as the source of the packet.

After reconstructing the packets, the packets may be sent to the network device 20, shown at Step 412. As previously described, the packets may be reconstructed and sent to the network device 20 in many different orders. Once received, the network device 20 can recognize the remote device 40 as the source of the packets. This may be done, for example, using the IP address in the source address field 170 of the IP packet header 150, which can identify the remote device 40 as the source of the packet.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of communicating a sequence of packets from a first entity to a second entity, the method comprising:

dividing the sequence of packets into a plurality of subsequences of packets;

sending each of the subsequences over a respective wireless communication channel and in turn to the second entity; and wherein each packet of each subsequence includes a header that has a source address field and a destination address field, wherein each of the subsequences defines a respective source address and a respective destination address, and wherein sending each of the subsequences over a respective wireless communication channel and in turn to the second entity comprises:

sending each of the subsequences over a respective wireless communication channel;

modifying the source address fields to change all of the respective source addresses to be a common source address; and modifying the destination address fields to change all of the respective destination addresses to be a common destination address.

2. The method of claim 1, wherein the respective source and destination addresses are respective IP addresses.

3. The method of claim 1, wherein sending each of the subsequences over a respective wireless communication channel comprises:

establishing respective PPP sessions for each of the wireless communication channels; and sending each of the subsequences over the respective wireless communication channel using the respective PPP sessions.

4. The method of claim 1, wherein the first entity is a router, an Ethernet concentrator, an Internet device, a personal digital assistant or a computer.

5. A method for increasing data transmission rates in a wireless network, the method comprising:

receiving a packet stream destined for a remote entity, the packet stream comprising a plurality of packets;

dividing the packet stream into a plurality of packet sub-streams, each comprising a subset of the plurality of packets;

sending each of the packet sub-streams over a respective wireless communication channel for transmission in turn to the remote entity; and wherein each packet of each sub-stream includes a header that has a source address field and a destination address field, wherein each of the sub-streams defines a respective source address and a respective destination address, and wherein sending each of the sub-streams over a respective wireless communication channel and in turn to the second entity comprises:

sending each of the sub-streams over a respective wireless communication channel;

modifying the source address fields to change all of the respective source address to be common source address; and modifying the destination address fields to change all of the respective destination addresses to be a common destination address.

6. The method of claim 5, wherein each of the packet sub-stream defines a respective source address, wherein all of the packet sub-streams define a common destination address, and wherein sending each of the packet sub-streams over a respective wireless communication channel for transmission in turn to the remote entity comprises:

sending each of the packet sub-streams over a respective wireless communication channel and thereafter to a translation node that converts the respective source addresses of the packet sub-streams to a common source address; and whereby the remote entity identifies the plurality of packets as originating from the common source address.

7. The method of claim 6, wherein the respective source addresses are respective IP addresses.

8. The method of claim 6, wherein the translation node is a gateway or a PDSN.

9. The method of claim 5, wherein each of the packet sub-streams defines a respective source address, wherein all of the packet sub-stream define a common destination address, and wherein sending each of the packet sub-streams over a respective wireless communication channel for transmission in turn to the remote entity comprises:

establishing respective PPP sessions with a PDSN for each of the packet sub-streams, wherein the PDSN provides connectivity with a packet switched network on which the remote entity resides.

10. The method of claim 5, wherein receiving the packet stream comprises:

receiving a packet stream of IP packets from a network device over an Ethernet connection.

11. The method of claim 5, wherein sending each of the packet sub-streams over a respective wireless communication channel comprises:

sending the packet sub-streams over a radio access network using respective Walsh codes.

12. An access aggregator, comprising:

a processor;

data storage;

an access interface capable of connecting to a network device; a plurality of wireless communication interfaces, each wireless communication interface operable to communicate over a respective wireless channel; and instructions stored in the data storage and executable on the processor (i) to receive a packet stream from the access interface, (ii) to divide the packet stream into a plurality of packet sub-streams, and (iii) and to transmit the plurality of packet sub-streams over the respective wireless channels, wherein each packet of each sub-stream includes a header that has a source address field and a destination address field, wherein each of the sub-streams defines a respective source address and a respective destination address, and wherein sending each of the sub-streams over a respective wireless communication channel and in turn to the second entity comprises: (a) sending each of the sub-streams over a respective wireless communication channel, (b) modifying the source address fields to change all of the respective source addresses to be a common source address, and (c) modifying the destination address fields to change all of the respective destination addresses to be a common destination address.

13. The access aggregator of claim 12, wherein the access interface is an RJ45 Ethernet port.

14. The access aggregator of claim 12, wherein the access interface comprises a plurality of access interfaces.

15. The access aggregator of claim 12, wherein the plurality of wireless communication interfaces includes a universal serial bus port, a PCMCIA slot, or a serial port.

16. The access aggregator of claim 12, further comprising:

a plurality of mobile stations respectively connected to the plurality of wireless communication interfaces.

17. The access aggregator of claim 16, wherein the plurality of mobile stations are capable of communicating over the respective wireless communication channels using respective IP addresses.

18. The access aggregator of claim 12, further comprising:

a network device connected to the access interface through an Ethernet connection.

19. The access aggregator of claim 18, wherein the device is a broadband voice router, an Ethernet concentrator, an Internet device, a personal digital assistant or a computer.

* * * * *